United States Patent [19]

Hamprecht

[11] 4,259,237

[45] Mar. 31, 1981

[54] AZO DYESTUFFS CONTAINING PHENOLIC COUPLING GROUP

[75] Inventor: Rainer Hamprecht, Cologne, Fed. Rep. of Germany

[73] Assignee: Bayer Aktiengesellschaft, Leverkusen, Fed. Rep. of Germany

[21] Appl. No.: 974,018

[22] Filed: Dec. 28, 1978

[30] Foreign Application Priority Data

Dec. 30, 1977 [DE] Fed. Rep. of Germany ....... 2759103

[51] Int. Cl.³ .................. C07C 107/06; C09B 29/12
[52] U.S. Cl. .................................. 260/206; 260/207
[58] Field of Search ............................. 260/206, 207

[56] References Cited

U.S. PATENT DOCUMENTS

| | | | |
|---|---|---|---|
| 3,951,591 | 4/1976 | Birke et al. | 260/206 |
| 3,962,209 | 6/1976 | Gotteschlich et al. | 260/206 |
| 4,046,757 | 9/1977 | Meybeck et al. | 260/207 |
| 4,053,465 | 10/1977 | Kruckenberg | 260/206 |
| 4,125,655 | 8/1978 | Gottschlich et al. | 260/206 |
| 4,134,887 | 1/1979 | Fuchs et al. | 260/207 |
| 4,148,791 | 4/1979 | Altermatt | 260/206 |
| 4,153,599 | 5/1979 | Rosati | 260/207 |

*Primary Examiner*—John F. Niebling
*Attorney, Agent, or Firm*—Sprung, Felfe, Horn, Lynch & Kramer

[57] ABSTRACT

Azo dyestuffs of the formula

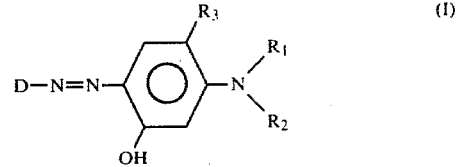

wherein
$R_1$ represents hydrogen or in some cases alkyl, aralkyl, aryl or cycloalkyl,
$R_2$ represents hydrogen or in some cases alkyl, alkenyl or aralkyl,
$R_3$ represents, inter alia, hydrogen, alkyl, halogen or cyano and
D represents the radical of a diazo component, are suitable for dyeing synthetic textile materials, in particular those made of polyethylene terephthalate. The scarlet-colored to blue dyeings obtained, in particular, with the preferred dyestuffs of the formula I, wherein D represents a o,o'-dicyanobenzene radical, are distinguished by good general fastness properties, good depth of color and a particularly clear color shade.

8 Claims, No Drawings

AZO DYESTUFFS CONTAINING PHENOLIC COUPLING GROUP

The invention relates to azo dyestuffs of the formula

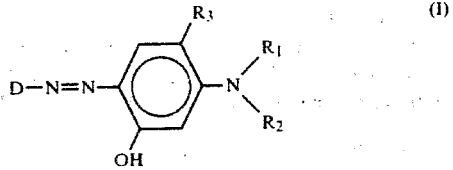

wherein
$R_1$ represents hydrogen, alkyl, aralkyl, aryl or cycloalkyl,
$R_2$ represents hydrogen, alkyl, alkenyl or aralkyl,
$R_3$ represents hydrogen, alkyl, halogen, cyano —OV or —COOW and
D represents a radical of the formula

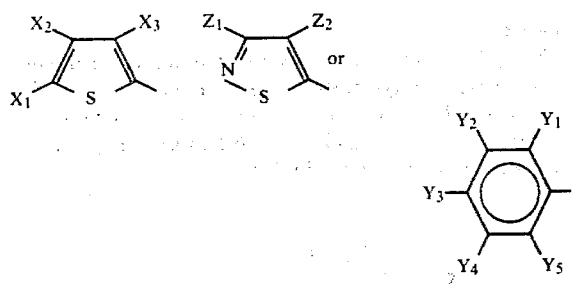

wherein
V denotes alkyl, alkenyl, aralkyl or aryl,
W denotes hydrogen or V,
$X_1$ denotes hydrogen, nitro, cyano, halogen, alkyl, aryl, alkoxycarbonyl, alkylcarbonyl, arylcarbonyl, —SCN, —CONW$_2$, alkylsulphonyl, arylsulphonyl or arylazo,
$X_2$ denotes hydrogen, alkyl or aryl,
$X_1$ and $X_2$ together denote the radical —(CH$_2$)$_3$—, —(CH$_2$)$_4$ or —CH=CH—CH=CH—,
$X_3$ denotes hydrogen, nitro, cyano, halogen, alkyl, aryl, alkylcarbonyl, alkoxycarbonyl, arylcarbonyl or —CONVW or
$X_2$ and $X_3$ together denote the radical —CH=CH—CH=CH—, $Y_1$ and $Y_5$ denote hydrogen, halogen, nitro, cyano, —CF$_3$, alkylsulphonyl, alkylcarbonyl, alkoxycarbonyl, aryloxycarbonyl or

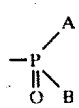

$Y_2$ and $Y_4$ denote hydrogen, alkyl, alkoxy, halogen, —CF$_3$ or VCONH—,
$Y_3$ denotes hydrogen, V, cycloalkyl, halogen, cyano, —CF$_3$, aryloxy, alkylsulphonyl, alkylcarbonyl, arylcarbonyl, —CO$_2$W, —SO$_2$N(W)$_2$, —CON(W)$_2$,

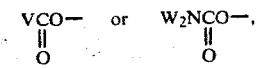

$Z_1$ denotes hydrogen, halogen, alkyl or aryl,
$Z_2$ denotes hydrogen or nitro or
$Z_1$ and $Z_2$ together denote —CH=CH—CH=CH—, and
A and B denote V, OV or N(W)$_2$,
the alkyl, aralkyl, alkenyl, cycloalkyl and aryl radicals mentioned above in any connection being optionally substituted by non-ionic substituents customary in the chemistry of azo dyestuffs or COOH.

"Bulky" radicals are in those positions where they cause no steric hindrance; for example tert.-butyl is in the m-position or p-position of a phenyl radical.

By cycloalkyl there is understood, preferably, cyclohexyl which is optionally monosubstituted by C$_1$-C$_4$-alkyl, OH, CN, halogen or C$_1$-C$_4$-alkoxy.

Suitable aryl is, in particular, phenyl which is optionally substituted 1 to 3 times by halogen, C$_1$-C$_4$-alkyl, C$_1$-C$_4$-alkoxy, nitro, cyclohexyl or phenyl, the last three radicals mentioned preferably only occurring once.

Suitable halogen is fluorine, chlorine, bromine or iodine, but preferably bromine and chlorine.

Suitable alkenyl radicals have 2-6 C atoms.

Suitable alkyl and alkoxy radicals have 1-6 C atoms, it being possible for the alkyl radicals in particular to carry a further substituent, such as halogen, cyano, alkoxy, aryl, aryloxy, acyl or acyloxy or such as those of the type indicated in the formulae below.

Preferred dystuffs correspond to the formulae IIa-IIc:

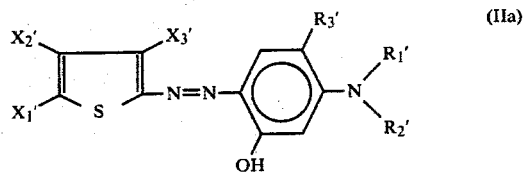

wherein
$X_1'$ denotes hydrogen, cyano, nitro, phenyl, alkyl, chlorine, bromine or alkoxycarbonyl,
$X_2'$ denotes hydrogen, alkyl or phenyl,
$X_3'$ denotes hydrogen, nitro, cyano or alkoxycarbonyl,
$R_1'$ denotes hydrogen, alkyl which is optionally substituted by a cyano, chlorine, bromine, —COCH=CH$_2$, phenyl, —SO$_2$CH=CH$_2$, —CO$_2$-alkyl, —OCO-alkyl, —OCO$_2$-alkyl, —OCO$_2$-phenyl, alkoxy, phenoxy, —OCONH-alkyl, —O-CONH-phenyl, —OPO(OQ)$_2$, —OPO(NUQ)$_2$, —PO(OQ)$_2$, —PO(OQ)(NUQ) or —PO(NUQ)$_2$, —(C$_2$H$_4$O)$_n$—U or —(C$_2$H$_4$O)$_n$—COQ,
$R_2'$ denotes hydrogen, cyclohexyl, phenyl or $R_1'$,
$R_3'$ denotes hydrogen, chlorine, alkyl or alkoxy,
Q denotes alkyl, alkenyl or phenyl,
U denotes hydrogen or Q and
n denotes 1,2,3,4 or 5,
it also being possible for the radical —NUQ to form the radical of a heterocyclic compound, for example piperidinyl, morphodinyl or pyrrolidinyl;

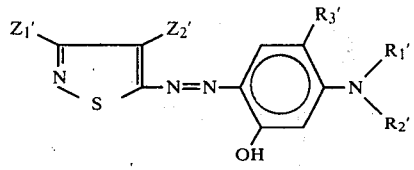 (IIb)

wherein
$Z_1'$ denotes hydrogen, chlorine, bromine, alkyl or phenyl and
$Z_2'$ denotes hydrogen, nitro or, together with $Z_1'$, —CH=CH—CH=CH—, optionally substituted by nitro, and
$R_1'$-$R_3'$ have the abovementioned meaning, and

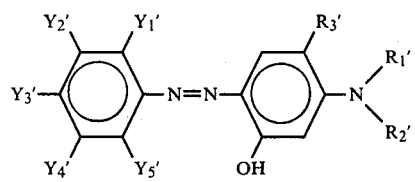 (IIc)

wherein
$Y_1'$ denotes nitro, cyano, alkylsulphonyl, $CF_3$ or $PO(OQ)_2$,
$Y_2'$ denotes hydrogen, alkyl, chlorine or bromine,
$Y_3'$ denotes hydrogen, alkyl, fluorine, chlorine, bromine, iodine, $CF_3$, cyano, alkylsulphonyl, β-chloroethylsulphonyl, —$CO_2$-alkyl, alkylcarbonyl, benzoyl, benzyl, (di)-alkylcarbamoyl, (di)-alkylsulfamoyl, (di)-alkylcarbamoyloxy —$CH_2PO(OQ)_2$ or Q—O—$(C_2H_4O)_n$—CO— (n=3–7),
$Y_4'$ denotes hydrogen,
$Y_5'$ denotes halogen, nitro, cyano, $CF_3$, alkoxycarbonyl, —$PO(OQ)_2$ or —$PO(NUQ)_2$ and
$R_1'$-$R_3'$, Q and U have the abovementioned meaning, the alkyl and alkoxy radicals having 1–4 C atoms, the alkenyl radicals having 3–5 C atoms and the phenyl radicals optionally containing 1–3 substituents from the group comprising methyl, methoxy, ethoxy, chlorine or bromine.

Preferred dyestuffs according to the invention are those which contain a benzene-type diazo component and also otherwise contain no heterocyclic radicals.

Within the scope of the dyestuffs of the formula IIc, those in which
$Y_1'$ denotes cyano,
$Y_2'$ denotes hydrogen or methyl,
$Y_3'$ denotes hydrogen, $C_1$-$C_4$-alkyl, alkylcarbonyl, benzoyl, trifluoromethyl, fluorine, chlorine, bromine, cyano, —$CO_2$-alkyl or $C_1$-$C_4$-alkylsulphonyl,
$Y_5'$ denotes chlorine, bromine, nitro, cyano, $CF_3$ or —$PO(OQ)_2$,
$R_1'$ denotes $C_1$-$C_4$-alkyl which is optionally substituted by phenyl, cyano, chlorine, —COCH=$CH_2$, —$SO_2CH$=$CH_2$, $C_1$-$C_4$-alkoxy, phenoxy, —O—CO—$C_1$-$C_4$-alkyl, —$OCO_2$—$C_1$-$C_4$-alkyl, —O—PO($C_1$-$C_4$-alkoxy)$_2$, —PO($C_1$—$C_4$-alkoxy)$_2$, —O—CONH-$C_1$-$C_4$-alkyl or —OCONH-phenyl,
$R_2'$ denotes hydrogen or $R_1'$ and
$R_3'$ denotes hydrogen or chlorine,
are in turn preferred.

Amongst these dyestuffs, those of the formula indicated, wherein $Y_2'$ denotes hydrogen,
$Y_3'$ denotes bromine, trifluoromethyl, $C_1$-$C_8$-alkoxycarbonyl, acetyl or benzoyl,
$Y_5'$ denotes cyano,
$R_1'$ denotes alkyl ($C_1$-$C_4$) which is optionally substituted by phenyl, alkylphenyl, cyano, chlorine, $C_1$-$C_4$-alkoxy or phenoxy and
$R_2'$ denotes hydrogen or $R_1'$,
are very particularly preferred.

The new azo dyestuffs of the formula (I) are prepared in a manner which is in itself known, for example by coupling diazotised anilines or the formula (III)

$$D-NH_2 \quad (III)$$

to coupling components of the formula (IV)

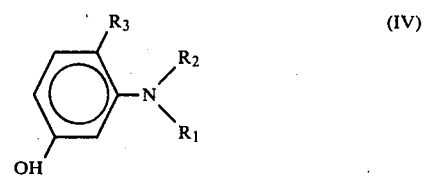 (IV)

wherein
D, $R_1$, $R_2$ and $R_3$ have the abovementioned meaning.

The preferred dyestuffs of the formula (IIc) wherein $Y_1'$-$Y_5'$ and $R_1'$, $R_2'$ and $R_3'$ have the abovementioned meaning are appropriately obtained by coupling diazotised anilines of the formula (V)

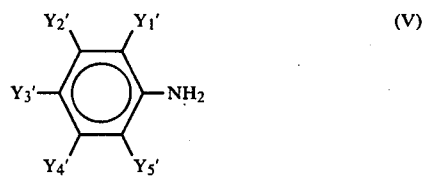 (V)

wherein
$Y_2'$-$Y_5'$ have the abovementioned meaning and
$Y_1''$ denotes chlorine, bromine or iodine,
to coupling components of the formula (VI)

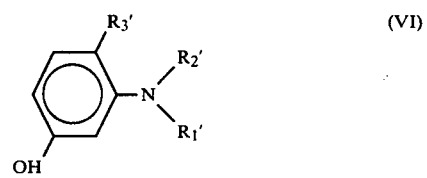 (VI)

wherein
$R_1'$-$R_3'$ have the abovementioned meaning, and converting the o-halogenoazo dyestuffs (VII)

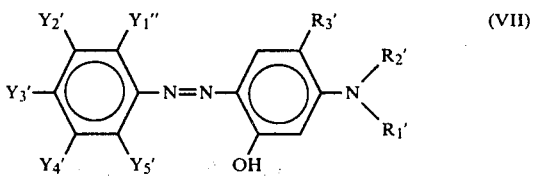 (VII)

into the dyestuffs of the formula (IIc) by a single or double nucleophilic replacement reaction with cyanides, nitrites, sulphinates or phosphorus compounds of the formulae (VIIIa) or (VIIIb)

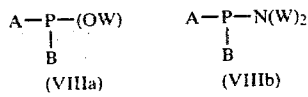

wherein

A, B, V and W have the abovementioned meaning. $Y_1''$ preferably represents bromine.

These replacement reactions are also in themselves known and are described, for example, in the following patent literature: DT-OS (German Published Specification) 1,544,563 = British Patent Specification No. 1,125,683; DT-OS (German Published Specification) Nos. 2,341,109 and 2,456,495, DT-OS (German Published Specification) No. 1,809,921 = British Patent Specification No. 1,255,367, DT-OS (German Published Specification) No. 1,807,642 = British Patent Specification No. 1,226,950, DT-OS (German Published Specification) No. 2,706,854 and DT-OS (German Published Specification) No. 2,717,091.

The replacement of halogen by cyano using a mixture of copper-I cyanide and zinc cyanide is particularly suitable and preferred.

Whilst the diazo components are generally known (those of the aniline series which contain no sulpho groups are preferred), only some of the coupling components are known, for example Japanese Pat. No. 47.254.88 (1972).

However, these compounds are easily obtained in a manner which is in itself known, for example by alkylating m-aminophenol or by reacting resorcinol with suitably substituted amines, in the presence of an acid condensing agent if appropriate.

Suitable coupling components are listed in the examples which follow.

The azo dyestuffs according to the invention are preferably suitable for dyeing synthetic textile materials, in particular textile materials made of secondary cellulose acetate and cellulose triacetate, polyamide, such as, for example, polyhexamethyleneadipamide, and especially aromatic polyester, such as, for example, polyethylene terephthalate, by the dyeing methods customary for these types of fibres, using aqueous or non-aqueous liquors.

Finally, the dyestuffs can also be applied to synthetic textile materials by transfer printing.

The scarlet-coloured to blue dyeings obtained, in particular, with the preferred dyestuffs of the formula IIc are distinguished by good general fastness properties, good depth of colour and a particularly clear colour shade.

EXAMPLE 1

Preparation of the dyestuff of the formula

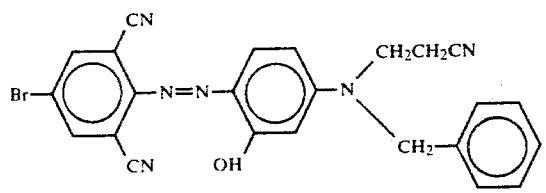

(a) Preparation of the coupling component 222.4 g of 3-amino-phenol, 132 ml of acrylonitrile, 40 ml of water, 40 ml of glacial acetic acid and 4 g of zinc chloride are heated to the boil, under reflux, for 5 hours. The mixture is extracted with methylene chloride and the methylene chloride phase is dried over sodium sulphate and concentrated in vacuo.

Yield: 315 g.

81 g of m-hydroxy-N-β-cyanoethyl-aniline, 95 g of benzyl chloride, 106 g of anhydrous sodium carbonate, 2 g of potassium iodide and 400 ml of ethanol are heated to 130° C. in an autoclave for 30 hours. The inorganic material is filtered off and the filtrate is concentrated in vacuo. The residue is dissolved in dilute sodium hydroxide solution, the sodium hydroxide solution is extracted with methylene chloride and the organic phase is discarded. The aqueous phase is brought to pH=4 and extracted several times with methylene chloride. The combined extracts are dried over sodium sulphate and concentrated in vacuo.

Yield: 78 g of m-hydroxy-N-β-cyanoethyl-N-benzyl-aniline (b) Preparation of 3-hydroxy-4-(2',4',6'-tribromophenylazo)-N-β-cyanoethyl-N-benzyl-aniline 9.6 g of 2,4,6-tribromoaniline are dissolved in 15 ml of water and 15 ml of 96 percent strength sulphuric acid. 4.8 ml of 42 percent strength nitrosylsulphuric acid are added dropwise at 38°–40° C. in the course of 30 minutes and stirring is continued at this temperature for a further hour. The diazotisation solution is added to a solution of 7.67 g of m-hydroxy-N-β-cyanoethyl-N-benzyl-aniline in 50 ml of glacial acetic acid and 20 ml of 10 percent strength aqueous amidosulphonic acid solution at 0°–5° C. The mixture is buffered at pH=3.5 with sodium acetate. The precipitate is filtered off, washed with water and dried.

Yield: 16.3 g of an orange powder.

(c) Preparation of 3-hydroxy-4-(2',6'-dicyano-4'-bromophenylazo)-N-β-cyanoethyl-N-benzylaniline A solution or suspension of 12.5 g of 3-hydroxy-4-(2',4',6'-tribromophenylazo)-N-α-cyanoethyl-N-benzylaniline, 2.34 g of zinc cyanide and 0.4 g of copper cyanide in 30 ml of dimethylformamide is heated to 100° C. for 30 minutes. After cooling to 50° C., the dyestuff is precipitated with 60 ml of methanol, filtered off and washed with 50 ml of 10 percent strength hydrochloric acid and water.

Yield: 6.8 g.

The mass spectrum gives a molecular weight of 485.

The dyestuff dyes polyesters a clear scarlet with very good fastness to light and sublimation.

EXAMPLE 2

Preparation of the dyestuff of the formula

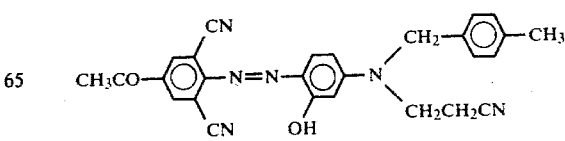

(a) 4.7 ml of 42 percent strength nitrosylsulphuric acid were added dropwise to a suspension of 8.5 g of 3,5-dibromo-4-aminoacetophenone in 20 ml of water and 18 ml of concentrated sulphuric acid (96% strength) at 35°–40° C. in the course of 30 minutes and stirring was continued at this temperature for a further hour. The clarified diazotisation solution was added to a solution of 8.1 g of 3-hydroxy-N-(4'-methyl-benzyl-N-β-cyanoethyl-aniline and 1 g of amidosulphonic acid in 100 ml of glacial acetic acid and 50 ml of dimethylformamide at 0°–5° C.

After diluting with 100 ml of water, the precipitate was filtered off, washed with water and dried.

Yield: 15.1 g

The coupling component required was obtained by reductive alkylation of m-aminophenol with 4-methyl-benzaldehyde and subsequent reaction of the product with acrylonitrile in dilute acetic acid in the presence of zinc chloride.

(b) A solution or suspension of 11.4 g of 3-hydroxy-4-(2',6'-dibromo-4'-acetyl-phenylazo)-N-(4''-methyl-benzyl)-N-(β-cyanoethyl)aniline, 2.23 g of zinc cyanide and 0.18 g of copper-I cyanide in 30 ml of dimethylformanilide was warmed to 100° C. for 45 minutes. After cooling to 40° C., the product was precipitated with 50 ml of methanol, filtered off and washed with methanol, 10 percent strength hydrochloric acid and water.

Yield: 6.45 g

The dyestuff dyes polyesters a clear bluish-tinged red with very good fastness to light and sublimation.

The dyestuffs listed in the table which follows can be obtained in good yield using an analogous or similar procedure.

| Example No. | Formula | Shade on polyester |
| --- | --- | --- |
| 3 | F$_3$C–⟨⟩(CN)(CN)–N=N–⟨⟩(OH)–N(CH$_2$–⟨⟩)(CH$_2$CH$_2$CN) | bluish-tinged scarlet |
| 4 | Cl–⟨⟩(CN)(CN)–N=N–⟨⟩(OH)–N(CH$_2$–⟨⟩)(CH$_2$CH$_2$CN) | scarlet |
| 5 | F–⟨⟩(CN)(CN)–N=N–⟨⟩(OH)–N(CH$_2$–⟨⟩)(CH$_2$CH$_2$CN) | reddish-tinged orange |
| 6 | CH$_3$O$_2$C–⟨⟩(CN)(CN)–N=N–⟨⟩(OH)–N(CH$_2$–⟨⟩)(CH$_2$CH$_2$CN) | bluish-tinged red |
| 7 | Br–⟨⟩(CN)(H$_3$C)(CN)–N=N–⟨⟩(OH)–N(CH$_2$–⟨⟩)(CH$_2$CH$_2$CN) | scarlet |
| 8 | ⟨⟩–CO–⟨⟩(CN)(CN)–N=N–⟨⟩(OH)–N(CH$_2$CH$_2$CN)(CH$_2$–⟨⟩–CH$_3$) | bluish-tinged red |
| 9 | CH$_3$–⟨⟩(CN)(CN)–N=N–⟨⟩(OH)–N(CH$_2$CH$_2$CN)(CH$_2$–⟨⟩) | reddish-tinged orange |
| 10 | F$_3$C–⟨⟩(CN)(CN)–N=N–⟨⟩(OH)–N(CH$_2$CH$_2$CN)(CH$_2$–CH$_3$) | bluish-tinged scarlet |
| 11 | Br–⟨⟩(CN)(CN)–N=N–⟨⟩(OH)–N(CH$_2$CH$_2$CN)(CH$_2$–CH$_3$) | yellowish-tinged red |

-continued

| Example No. | Formula | Shade on polyester |
|---|---|---|
| 12 | F$_3$C–C$_6$H$_2$(CN)(CN)–N=N–C$_6$H$_3$(OH)–N(CH$_2$C$_6$H$_5$)$_2$ | pink |
| 13 | Br–C$_6$H$_2$(CN)(CN)–N=N–C$_6$H$_3$(OH)–N(CH$_2$C$_6$H$_5$)$_2$ | bluish-tinged scarlet |
| 14 | C$_8$H$_{17}$O$_2$C–C$_6$H$_2$(CN)(CN)–N=N–C$_6$H$_4$–N(CH$_2$C$_6$H$_5$)$_2$ | red |
| 15 | Br–C$_6$H$_2$(CN)(CN)–N=N–C$_6$H$_3$(OH)–N(C$_2$H$_4$OC$_2$H$_4$CN)$_2$ | scarlet |
| 16 | H$_3$C–C$_6$H$_2$(CN)(CN)–N=N–C$_6$H$_3$(OH)–N(C$_2$H$_4$OC$_2$H$_4$CN)$_2$ | yellowish-tinged scarlet |
| 17 | F$_3$C–C$_6$H$_2$(CN)(CN)–N=N–C$_6$H$_3$(OH)–N(C$_2$H$_4$OC$_2$H$_4$CN)$_2$ | red |
| 18 | Br–C$_6$H$_2$(CN)(CN)–N=N–C$_6$H$_3$(OH)–NH–C$_6$H$_5$ | bluish-tinged red |
| 19 | CH$_3$–C$_6$H$_2$(CN)(CN)–N=N–C$_6$H$_3$(OH)–NH–C$_6$H$_5$ | yellowish-tinged red |
| 20 | Br–C$_6$H$_2$(CN)(CN)–N=N–C$_6$H$_3$(OH)–N(C$_2$H$_4$OCOCH$_3$)$_2$ | red |
| 21 | CH$_3$–C$_6$H$_2$(CN)(NO$_2$)–N=N–C$_6$H$_3$(OH)–N(C$_2$H$_4$OC$_6$H$_5$)$_2$ | scarlet |
| 22 | CH$_3$–C$_6$H$_2$(CN)(CN)–N=N–C$_6$H$_3$(OH)–N(C$_2$H$_4$CO$_2$CH$_3$)(CH$_2$CH$_3$) | scarlet |
| 23 | Br–C$_6$H$_2$(CN)(CN)–N=N–C$_6$H$_3$(OH)–N(C$_2$H$_4$Cl)$_2$ | red |
| 24 | Br–C$_6$H$_2$(CN)(CN)–N=N–C$_6$H$_3$(OH)–N((C$_2$H$_4$O)$_4$CH$_3$)(C$_2$H$_5$) | red |

-continued

| Example No. | Formula | Shade on polyester |
|---|---|---|
| 25 | Br-C6H2(CN)2(CN)-N=N-C6H3(OH)-N(CH2CH3)(CH2CH2CH2-P(O)(OCH3)2) | red |
| 26 | Br-C6H2(CN)2(CN)-N=N-C6H3(OH)-N(CH2CH2-OCONH-C4H9)2 | red |
| 27 | NC-C6H2(CN)(CN)-N=N-C6H3(OH)-N(CH2CH3)2 | violet |
| 28 | CH3-C6H2(NO2)(PO(OC2H5)2)-N=N-C6H3(OH)-NH-C6H5 | yellowish-tinged red |
| 29 | CH3SO2-C6H2(CN)(CN)-N=N-C6H3(OH)-NH-C6H4Cl | violet |
| 30 | Cl-C6H2(CF3)(CN)-N=N-C6H3(OH)-N(CH2CH2CH3)2 | yellowish-tinged red |
| 31 | O2N-thienyl(NO2)-N=N-C6H3(OH)-NH-C6H5 | blue |
| 32 | O2N-thienyl(NO2)-N=N-C6H3(OH)-N(CH2CH2CN)(CH2-C6H5) | violet |
| 33 | H3C,O2N-thienyl(CN)-N=N-C6H3(OH)-N(CH2CH2CN)(CH2CH3) | violet |
| 34 | CH3-isothiazolyl(NO2)-N=N-C6H3(OH)-N(CH2CH2CN)(CH2-C6H5) | red-violet |
| 35 | CH3-isothiazolyl(CN)-N=N-C6H3(OH)-N(CH2CH2CN)(CH2-C6H5) | red-violet |
| 36 | benzisothiazolyl(NO2)-N=N-C6H3(OH)-N(C2H5)(C2H4CN) | blue |

-continued

| Example No. | Formula | Shade on polyester |
|---|---|---|
| 37 | 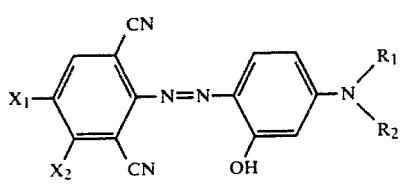 | scarlet |
| 38 | 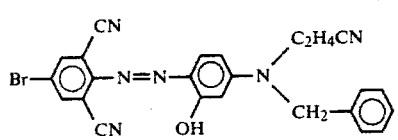 | scarlet |

I claim:
1. Dyestuffs of the formula

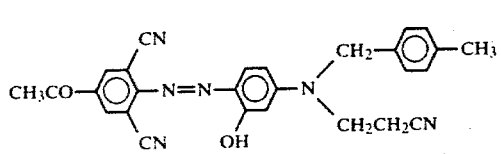

wherein
$X_1$ = Cl, F, Br, $CH_3$, $CF_3$, $C_1$-$C_8$-alkoxycarbonyl, acetyl, benzoyl, methylsulfonyl-
$X_2$ = H or $CH_3$
$R_1$ = benzyl, methylbenzyl, phenyl, chlorophenyl, $C_2H_4OC_2H_4CN$, $C_2H_4OCOCH_3$, $C_2H_4OCONHC_4H_9$,
$R_2$ = $C_2H_4CN$, benzyl, $C_2H_4OC_2H_4CN$, $C_2H_4OCOCH_3$, $C_2H_4OCONHC_4H_9$ or H.

2. An azo dyestuff according to claim 1 of the formula

3. An azo dyestuff according to claim 1 of the formula

4. An azo dyestuff according to claim 1 of the formula

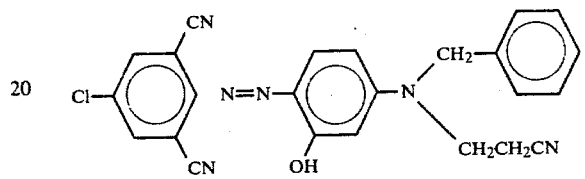

5. An azo dyestuff according to claim 1 of the formula

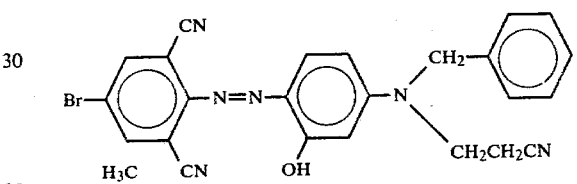

6. An azo dyestuff according to claim 1 of the formula

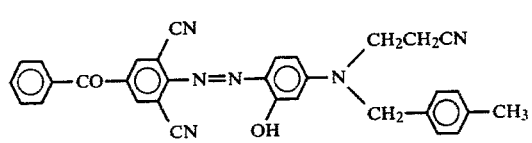

7. An azo dyestuff according to claim 1 of the formula

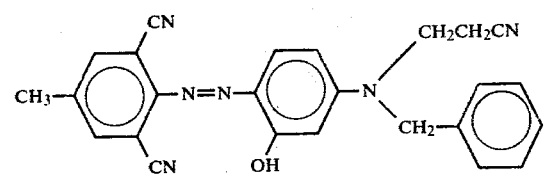

8. An azo dyestuff according to claim 1 of the formula

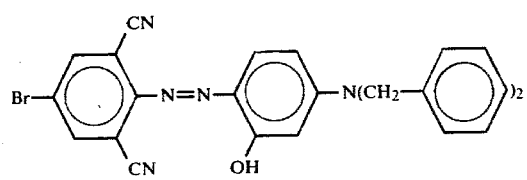

* * * * *